(12) United States Patent
Kikuchi et al.

(10) Patent No.: US 9,268,175 B2
(45) Date of Patent: Feb. 23, 2016

(54) DISPLAY DEVICE

(75) Inventors: Katsutoshi Kikuchi, Osaka (JP); Masayuki Ohhashi, Osaka (JP); Hajime Washio, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 151 days.

(21) Appl. No.: 14/007,618

(22) PCT Filed: Mar. 21, 2012

(86) PCT No.: PCT/JP2012/057162
§ 371 (c)(1),
(2), (4) Date: Sep. 25, 2013

(87) PCT Pub. No.: WO2012/133035
PCT Pub. Date: Oct. 4, 2012

(65) Prior Publication Data
US 2014/0022472 A1  Jan. 23, 2014

(30) Foreign Application Priority Data
Mar. 28, 2011 (JP) .................... 2011-070219

(51) Int. Cl.
*G02F 1/1339* (2006.01)
*G02F 1/1335* (2006.01)
*G02B 27/22* (2006.01)
*H04N 13/04* (2006.01)
*G02F 1/1333* (2006.01)

(52) U.S. Cl.
CPC .......... *G02F 1/1339* (2013.01); *G02B 27/2214* (2013.01); *H04N 13/0409* (2013.01); *G02F 1/133308* (2013.01); *G02F 2201/503* (2013.01)

(58) Field of Classification Search
CPC ............. G02B 27/2214; G02F 1/1339; H04N 13/0409
USPC .......................................................... 349/15
See application file for complete search history.

(56) References Cited

U.S. PATENT DOCUMENTS

2008/0186572 A1 * 8/2008 Tomikawa ......... G02B 27/2214
359/462

FOREIGN PATENT DOCUMENTS

JP  2004-279932 A  10/2004
JP  2006-11212  * 12/2006
(Continued)

OTHER PUBLICATIONS

International Search Report corresponding to PCT/JP2012/057162, dated May 22, 2012.

*Primary Examiner* — Dung Nguyen
(74) *Attorney, Agent, or Firm* — Hauptman Ham, LLP

(57) ABSTRACT

A liquid crystal display device includes a display panel, a parallax barrier, and a spacer. The display panel includes a display area in which an image is displayed and a display surrounding area located around the display area. The parallax barrier includes a separation area and a separation surrounding area located around the separation area. The image displayed on the display panel is separated by parallax in the separation area. The parallax barrier is attached to the display panel with a space between the separation surrounding area of the parallax barrier and the display surrounding area of the display panel. The spacer is arranged in the space. The spacer is configured to define a distance between the display surrounding area of the display panel and the separation surrounding area of the parallax barrier.

14 Claims, 15 Drawing Sheets

(56) References Cited　　　　　　　　　　　　* cited by examiner

FOREIGN PATENT DOCUMENTS

| | | | |
|---|---|---|---|
| JP | 3879454 | B2 | 2/2007 |
| JP | 2009-122655 | * | 6/2009 |
| JP | 4370207 | B2 | 11/2009 |

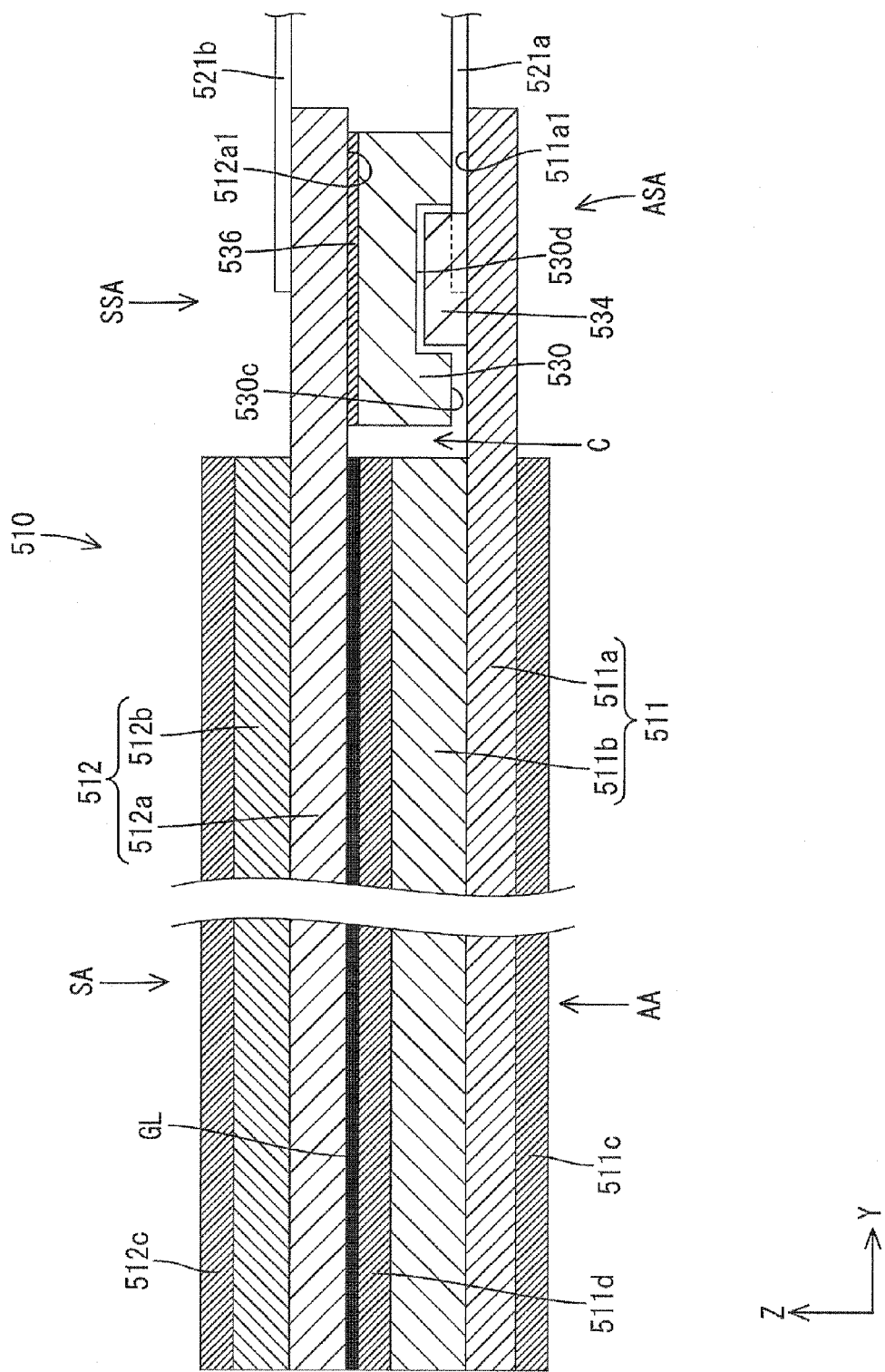

DISPLAY DEVICE

RELATED APPLICATIONS

The present application is a National Phase of International Application Number PCT/JP2012/057162, filed Mar. 21, 2012, and claims priority from Japanese Application Number 2011-070219, filed Mar. 28, 2011.

TECHNICAL FIELD

The present invention relates to a display device.

BACKGROUND ART

An electronic device such as a mobile terminal device, a computer, and a television device includes a display device having a display panel such as a liquid crystal panel. Examples of the mobile terminal device include a mobile phone, a smart phone, and PDA. In such a device, a "parallax barrier" function may be used to display stereoscopic images. The parallax barrier function uses the characteristics of human eyes to perceive three-dimensional images based on binocular parallax, that is, difference between the images viewed through the left and right eyes.

Patent Document 1 discloses a display device having a function to display a stereoscopic image. The display device includes a display panel and a parallax barrier attached to each other with adhesive and bonded to each other so as to overlap an image displaying area of the display panel in a plan view.

RELATED ART DOCUMENT

Patent Document

Patent Document 1: Japanese Unexamined Patent Application Publication No. 2004-279932

Problem to be Solved by the Invention

According to the configuration of the display device disclosed in Patent Document 1, the display panel and the parallax barrier are attached to each other with a space therebetween. The space is formed in an area between the display panel and the parallax barrier in which the image displaying area of the display panel does not overlap the parallax barrier in a plan view (an area overlapping with a surrounding area around the image displaying area). If a stress directing toward the space, which maybe induced by an impact, is applied to the area of the parallax barrier corresponding to the surrounding area around the image displaying area, the parallax barrier may significantly warp toward the space and may be damaged. Similarly, if an impact-induced stress directing toward the space is applied to the area of the display panel corresponding to the surrounding area around the image displaying area, the display panel may significantly warp toward the space and may be damaged.

DISCLOSURE OF THE PRESENT INVENTION

The present invention was accomplished in view of the above circumstances. It is an object of the present invention to provide a technology that can prevent or suppress the breakage of a display panel and a parallax barrier caused by an impact-induced stress in a display device including the display panel and the parallax barrier that are attached to each other.

Means for Solving the Problem

The present invention relates to a display device including a display panel, a parallax barrier, and a spacer. The display panel includes a display area in which an image is displayed and a display surrounding area located around the display area. The parallax barrier includes a separation area and a separation surrounding area that is located around the separation area. The separation area in which the image displayed on the display panel is separated by parallax. The parallax barrier is attached to the display panel with a space between the separation surrounding area of the parallax barrier and the display surrounding area of the display panel. The spacer is arranged in the space and configured to define a distance between the display surrounding area of the display panel and the separation surrounding area of the parallax barrier.

According to the above display device, if a stress directing toward the space between the display panel and the parallax barrier is applied to the display surrounding area of the display panel or the separation surrounding area of the parallax barrier, the spacer becomes in contact with the display panel or the parallax barrier. Therefore, the further warping of the display panel or the parallax barrier can be prevented or suppressed and thus the breakage of the display panel or the parallax barrier is hardly or less likely to occur. In other words, in the display device including the display panel and the parallax barrier attached to each other, the breakage of the display panel or the parallax barrier caused by an impact-induced stress can be prevented or reduced.

The spacer may be attached on a surface of the display surrounding area of the display panel that is exposed to the space.

With such a configuration, the spacer is hardly or less likely to be displaced.

The spacer may be attached on a surface of the separation surrounding area of the parallax barrier that is exposed to the space.

With such a configuration, the spacer is hardly or less likely to be displaced.

The spacer may be attached by a double-sided tape to one of the surfaces of the display panel and the parallax barrier that is exposed to the space.

A thickness of the double-sided tape is easily adjusted. Therefore, in the above configuration, the distance between the display surrounding area of the display panel and the separation surrounding area of the parallax barrier can be effectively defined by the spacer and the double-sided tape.

The spacer may be formed of a plurality of materials and at least one of the plurality of materials is a material having elasticity.

With such a configuration, even if a stress directing toward the inside (the space side) is applied to a member on one side, the material having elasticity absorbs the stress and thus an excessive load is hardly or less likely to be applied to the member on the one side.

The spacer may include a facing surface and a plurality of projections provided on the facing surface. The facing surface may face one of the display surrounding area of the display panel and the separation surrounding area of the parallax barrier with a predetermined distance.

With such a configuration, the stress applied to the spacer can be dispersed by the plurality of the projections.

Each one of the projections may have a spherical surface.

With such a configuration, the stress applied to the spacer can be effectively dispersed by the plurality of the projections.

The display panel may include an array substrate and a color filter substrate attached to the array substrate with a liquid crystal layer therebetween. The parallax barrier may include a first substrate and a second substrate. The space may be provided between an area of the array substrate corresponding to the display surrounding area and an area of the first substrate corresponding to the separation surrounding area. The spacer may have a thickness that is equal to or smaller than a distance between an area of the array substrate corresponding to the display area and an area of the first substrate corresponding to the separation area.

In a configuration in which the spacer is arranged between the display surrounding area of the array substrate and the separation surrounding area of the first substrate, if the thickness of the spacer is larger than the distance between the display area of the array substrate and the separation area of the first substrate, the spacer is in contact with and outwardly presses the display surrounding area of the array substrate and the separation surrounding area of the first substrate, respectively. As a result, stresses directing sides opposite the space side (the outsides) are applied to the both substrates. In such a case, each of the display surrounding area of the array substrate and the separation surrounding area of the first substrate warps toward the outside and both or one of the substrates may be broken by an impact. However, with the above configuration, the stresses directing to the outsides are not applied to the display surrounding area of the array substrate and the separation surrounding area of the first substrate. Thus, the breakage of the array substrate and the first substrate is hardly or less likely to occur.

The second substrate, the first substrate, the color filter substrate, and the array substrate may be arranged in this sequence from a display surface side. An area of the color filter substrate corresponding to the display area and an area of the first substrate corresponding to the separation area may be attached to each other.

With this configuration, the display device including the parallax barrier and the display panel that are arranged in this sequence from the front side can be achieved.

The display device may further include a first marker provided to the area of the array substrate corresponding to the display surrounding area and a second marker provided to the area of the first substrate corresponding to the separation surrounding area. The color filter substrate and the second substrate may be attached to each other such that the first marker overlaps the second marker in a plan view. The spacer may be arranged so as not to overlap the first marker and the second marker in a plan view.

With this configuration, the spacer can be arranged without covering the first and second markers that are provided for positioning the display panel and the parallax barrier. Therefore, the display panel and the parallax barrier can be attached to each other in a predetermined position by the first and second markers.

The display device may further includes a first flexible substrate connected to an outer end portion of the display panel corresponding to the display surrounding area a second flexible substrate connected to an outer end portion of the parallax barrier corresponding to the separation surrounding area. The spacer may be arranged so as to partially overlap the first flexible substrate in a plan view.

With such a configuration, while achieving a configuration in which the first flexible substrate and the second substrate are connected to the display panel and the parallax barrier, respectively, the spacer can be arranged in the space without being obstructed by the first flexible substrate.

A part of the spacer that overlaps with the first flexible substrate in a plan view may have a thickness smaller than a thickness of other part of the spacer that does not overlap with the first flexible substrate.

With such a configuration, the thickness of the part of the spacer that overlaps with the first flexible substrate is less likely to become too large relative to the thickness of the other part of the spacer. Accordingly, stresses directing toward sides opposite the space side (the outsides) are hardly or less likely to be applied to the array substrate and the first substrate by the thickness of the part of the spacer.

The display device may further includes an IC chip arranged on a surface of the array substrate that is exposed to the space. The spacer may be arranged so as not to overlap the IC chip in a plan view.

With such a configuration, while achieving a configuration in which the IC chip can be arranged on the display panel, the spacer can be arranged in the space without being obstructed by the IC chip.

Advantageous Effect of the Invention

According to the technology of the present invention, the breakage of a substrate caused by an impact stress can be prevented or suppressed in the display device including the display panel and the parallax barrier that are attached to each other.

BRIEF DESCRIPTION OF THE DRAWINGS

FIG. 15 is a cross-sectional view of a liquid crystal panel 510 taken along a long-side direction thereof according to a sixth embodiment.

MODE FOR CARRYING OUT THE INVENTION

<First Embodiment>

A first embodiment of the present invention will be described with reference to drawings. In this embodiment, a liquid crystal display device 10 (an example of a display device) is described. An X-axis, a Y-axis, and a Z-axis are described in a part of each drawing. Directions indicated by the axes in each drawing correspond to directions indicated by the respective axes in other drawings. The upper sides of FIGS. 2 and 3 correspond to a front side. The lower sides of FIGS. 2 and 3 correspond to a rear side.

Figure 1:
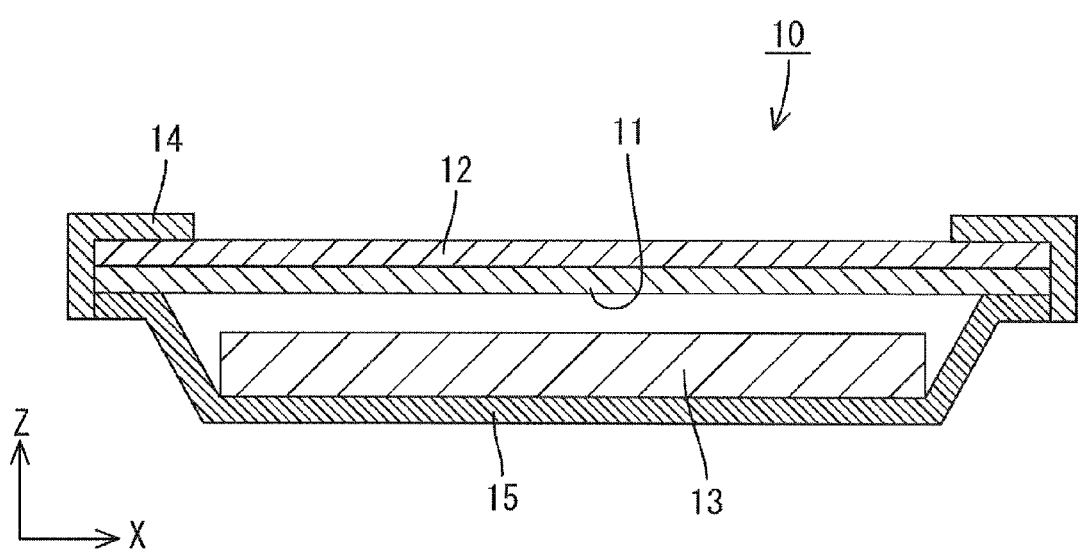
FIG. 1 is a cross-sectional view illustrating a general configuration of a liquid crystal display device 10 according to a first embodiment.
Figure 2:
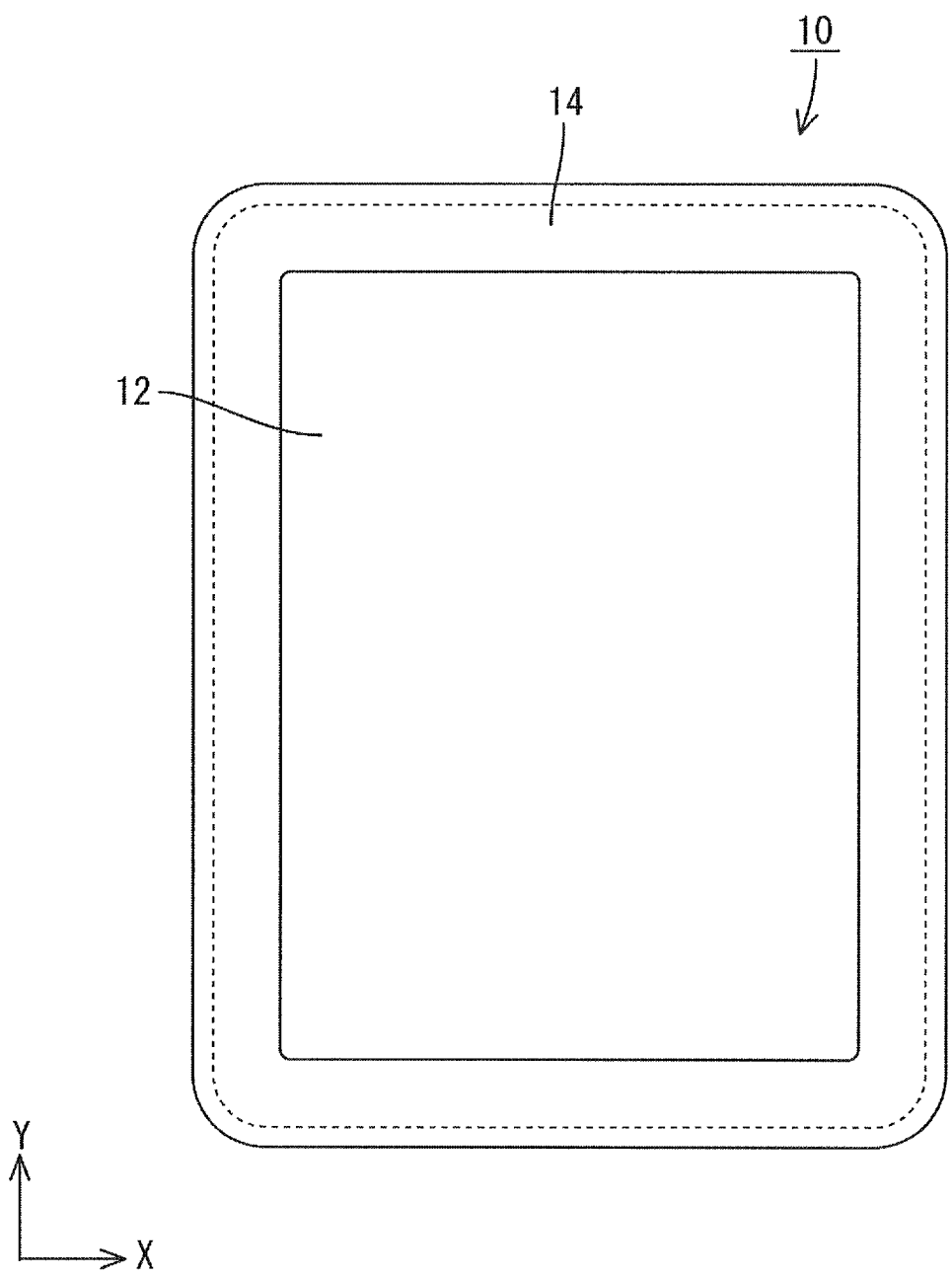
FIG. 2 is a plan view of the liquid crystal display device 10.

As illustrated in FIGS. 1 and 2, the liquid crystal display device 10 has a rectangular shape as a whole. The liquid crystal display device 10 may be placed in a portrait orientation (in a vertical position) or a landscape orientation (in a horizontal position). The liquid crystal display device 10 includes a liquid crystal panel 11 (an example of a display panel), a parallax barrier 12, and a backlight unit 13 (an example of a lighting device). The liquid crystal panel 11 is configured to display an image on a display surface thereof. The parallax barrier 12 is configured to allow a viewer to see the image displayed on the display surface of the liquid crystal panel 11 as a stereoscopic image (a 3D image, a three-dimensional image). The backlight unit 13 is an external light source configured to emit light to the liquid crystal panel 11 and the parallax barrier 12.

The parallax barrier 12 is arranged on a front side (a display surface side, a light exiting side) of the liquid crystal panel 11. The parallax barrier 12 and the liquid crystal panel are bonded together with an adhesive layer GL provided therebetween. The liquid crystal display device 10 further includes a bezel 14 and a housing 15. The bezel 14 holds the liquid crystal panel 11 and parallax barrier 12 that are bonded to each other. The housing 15 houses the liquid crystal panel 11 and the backlight unit 13. The bezel 14 is attached to the housing 15. The liquid crystal display device 10 in the present embodiment is used in various electronic devices (not illustrated) such as a handheld terminal (including an e-book and PDF), a mobile phone (including a smart phone), a laptop computer, a digital photo frame, and a handheld gaming device. Accordingly, the liquid crystal panel 11 included in the liquid crystal display device 10 has a display size within a range of a few inch, for example, 3.4 inches, to about 10 inches. That is, the liquid crystal panel 11 has a compact size or a small-medium size.

The backlight unit 13 is briefly described. The backlight unit 13 is an edge-light type (a side-light type) backlight unit. The backlight unit 13 includes light sources, a box-like chassis, a light guiding member, and an optical member. The light sources are arranged to face ends of the light guiding member. The chassis has an opening on the front side (the liquid crystal panel 11 side, the light exiting side) and houses the light sources. The light guiding member is configured to guide light from the light sources to the opening of the chassis. The optical member is arranged to cover the opening of the chassis. The light emitted from the light sources enters the ends of the light guiding member and travels through the light guiding member. The light guiding member guides the light to the opening of the chassis. The optical member converts the light into a planar light having an even brightness distribution and then the light is applied to the liquid crystal panel 11. An amount of light passing through the liquid crystal panel 11 is selectively controlled in the display surface by the driving of TFTs 16 included in the liquid crystal panel 11, and thus a predetermined image is displayed on the display surface. The light sources, the chassis, the light guiding member, and the optical member are not illustrated in detail.

Figure 3:
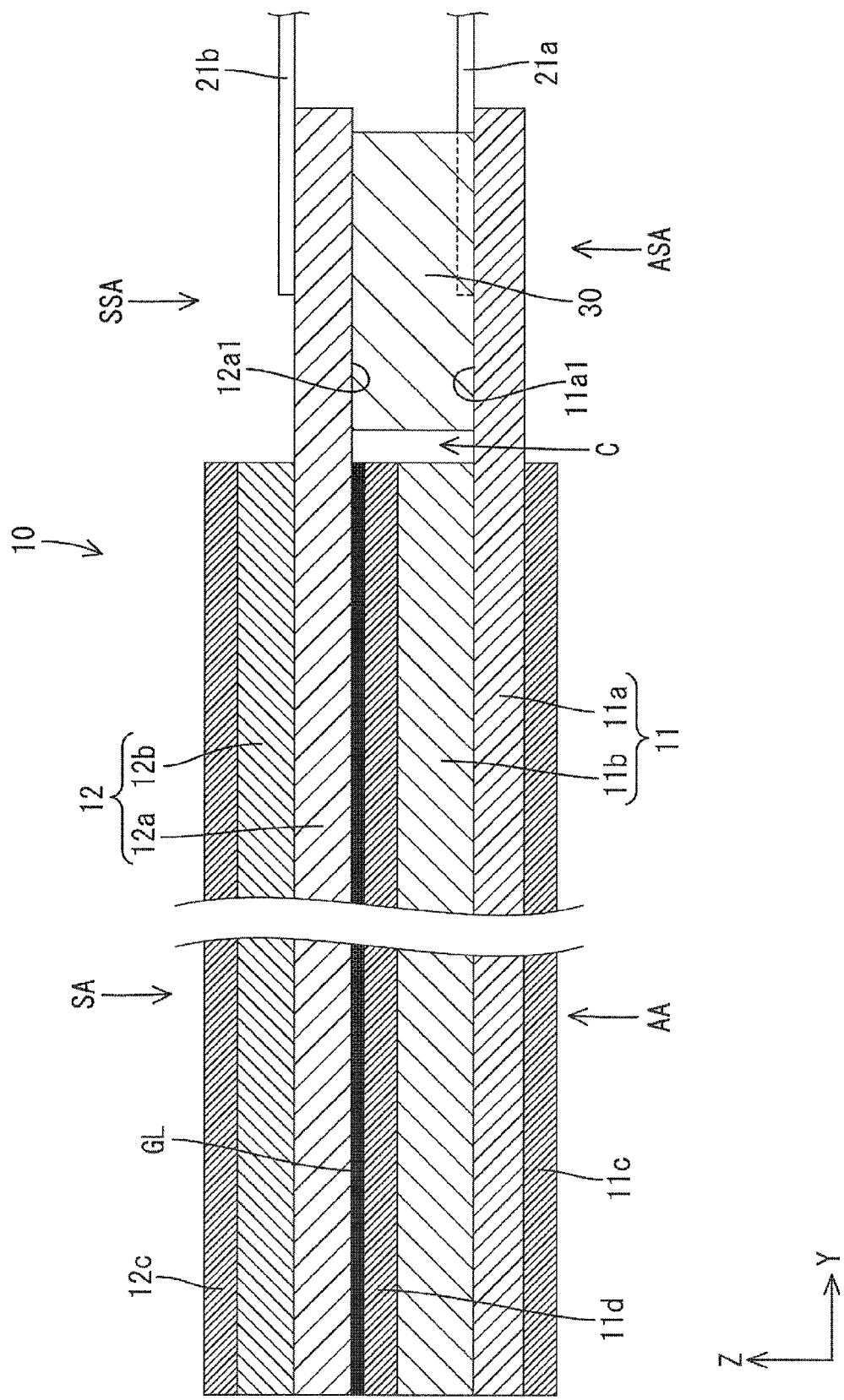
FIG. 3 is a cross-sectional view of the liquid crystal display device 10 taken along a long-side direction thereof.
Figure 4:
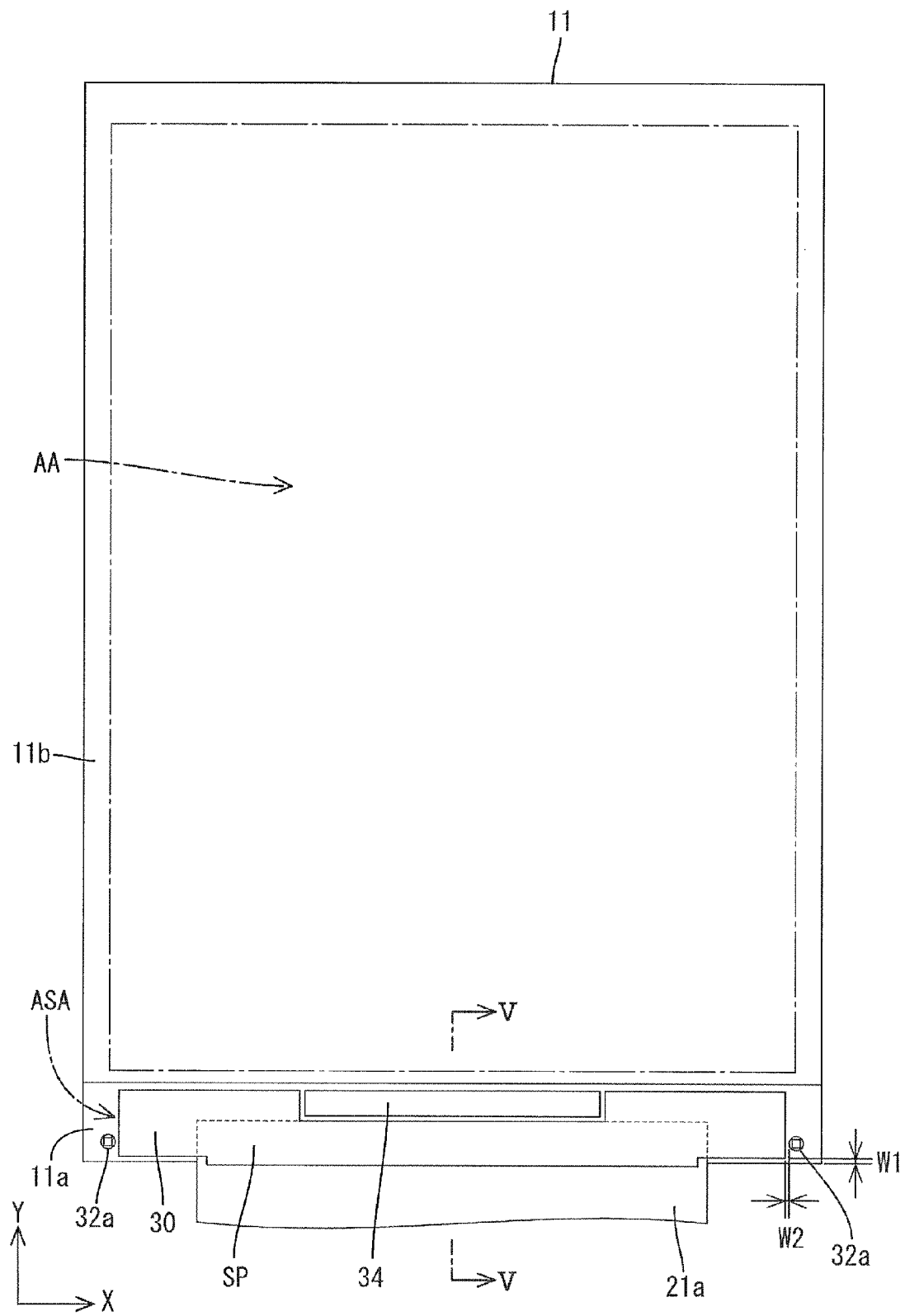
FIG. 4 is a plan view of a liquid crystal panel 11 to which a panel flexible substrate 21a is connected.

Next, the liquid crystal panel 11 is described. As illustrated in FIGS. 3 and 4, the liquid crystal panel 11 includes a pair of transparent rectangular glass substrates 11a and 11b (having light transmissivity) and a liquid crystal layer (not illustrated) provided therebetween. The liquid crystal layer includes liquid crystal molecules having optical characteristics that vary according to electric fields applied thereto. The substrates 11a and 11b are bonded together with sealant, which is not illustrated, leaving a space corresponding to a thickness of the liquid crystal layer therebetween. As illustrated in FIG. 4, the liquid crystal panel 11 includes a display area AA (the part enclosed by the chain line in FIG. 4) and a display surrounding area ASA. An image is displayed in the display area AA. The display surrounding area ASA has a substantially frame-like shape and is located around the display area AA. An image is not displayed in the display surrounding area ASA. As illustrated in FIG. 3, polarizing plates 11c and 11d are attached to outer surfaces side of the substrates 11a and 11b, respectively. Each of the substrates 11a and 11b has a size (area) that is substantially same as a size of the display area AA. One of the polarizing plates 11c and 11d that is on the front side is the polarizing plate 11d (the parallax barrier 12 side). On an outer surface of the polarizing plate 11d facing the front side (the parallax barrier 12 side), that is, a surface facing the parallax barrier 12, the above-described adhesive layer GL is provided to substantially an entire area thereof.

Figure 5:
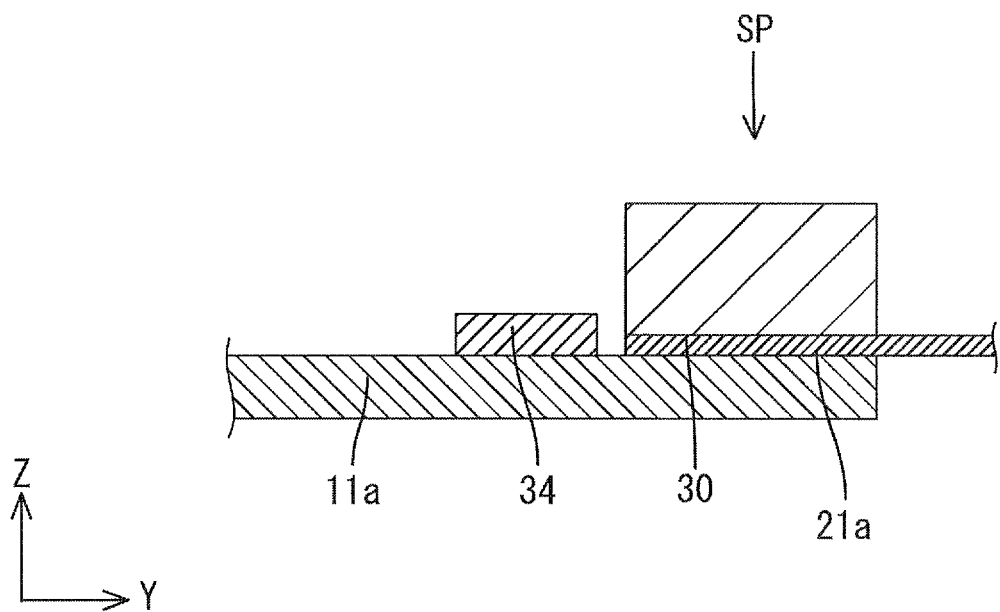
FIG. 5 is a cross-sectional view taken along a line V-V in FIG. 4.

One of the substrates 11a and 11b that is on the front side is a CF substrate 11b and the other one on the rear side is an array substrate 11a. As illustrated in FIG. 5, the thin film transistors (TFTs) 16 as switching components and pixel electrodes 17 are arranged on an inner surface side (a liquid crystal layer side, a side facing the CF substrate 11a) of the array substrate 11b. Around the TFTs 16 and the pixel electrodes 17, gate lines 18 and source lines 19 are arranged in a grid. The gate lines 18 and the source lines 19 each are made of copper, which is a light blocking material having conducting properties (a metal material having light blocking properties). The gate lines 18 and the source lines 19 are connected to gate electrodes and source electrodes of the respective TFTs 16. The pixel electrodes 17 are connected to drain electrodes of the respective TFTs 16.

Terminals (not illustrated) extended from the gate lines 18 and source lines 19 are arranged at an end portion of the array substrate 11a in a long-side direction. As illustrated in FIG. 4, one end of a panel flexible substrate 21a is connected to the terminals. The panel flexible substrate 21a is connected to the terminals with pressure via an anisotropic conductive film (ACF), which is not illustrated. The other end of the panel flexible substrate 12 is connected to a control board, which is not illustrated. The panel flexible substrate 21a can transmit an image signal fed from the control board to each of the lines 18 and 19 of the liquid crystal panel 11. Further, an IC chip 34 is arranged on the end portion of the array substrate 11a to which the panel flexible substrate 21a is connected. The IC chip 34 is mounted on the array substrate 11a with a chip on glass method (COG) and configured to control liquid crystals. The terminals, the panel flexible substrate 21a, and the IC chip 34 are arranged in the above-described display surrounding area ASA. The pixel electrodes 17 are made of transparent electrodes such as indium tin oxide (ITO) and zinc oxide (ZnO).

Figure 6:
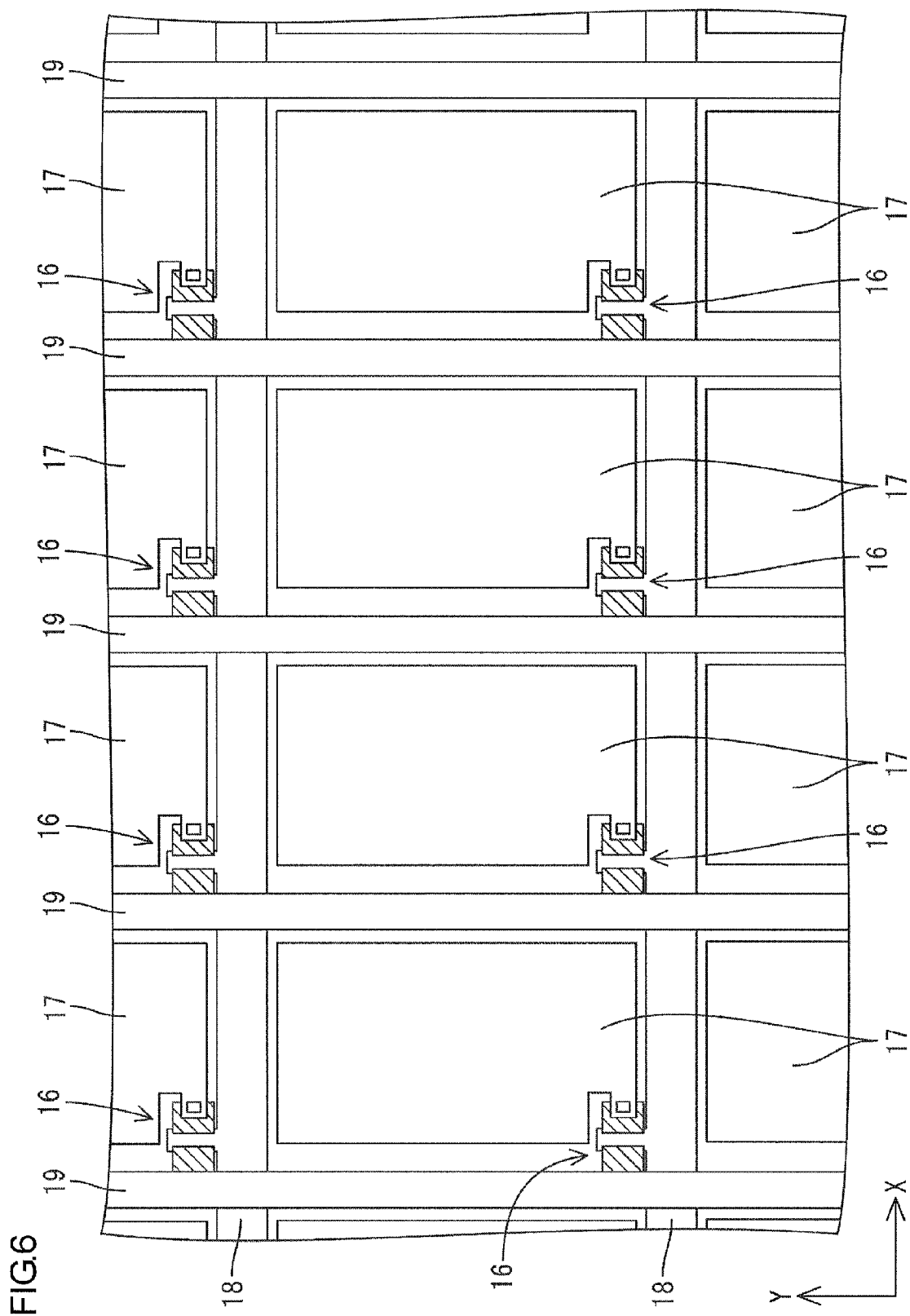
FIG. 6 is a plan view illustrating an arrangement of pixel electrodes 17 and respective lines 18 and 19 on an array substrate 11a included in the liquid crystal panel 11.

As illustrated in FIG. 6, on an inner surface side (a liquid crystal layer side, a side facing the array substrate 11a) of the CF substrate 11b, a color filter is arranged so as to overlap the pixel electrodes 17 on the array substrate 11a in a plan view. The color filter includes color sections 22 each providing red (R), green (G), and blue (B). The color sections 22 are alternately arranged in the X-axis direction. Each of the color sections 22 has a rectangular shape in a plan view. A long-side direction and a short-side direction of the color section 22 match the long-side direction and the short-side direction of each of the substrates 11a and 11b. The color sections 22 are arranged on the CF substrate 11a in the X-axis direction and the Y-axis direction in a matrix. Between the color sections 22 included in the color filter, a grid-like light blocking section (a black matrix) 23 is provided. The light blocking section 23 prevents color mixing. The light blocking section 23 is arranged to overlap the gate lines 18 and the source lines 19 on the array substrate 11a. In the liquid crystal panel 11, the R, G, B color sections 22 and three pixel electrodes 17 corresponding thereto configure a single pixel PX that is a unit for display. The pixels PX are arranged along a main substrate surface in the substrates 11a and 11b, that is, the display surface (along the X-axis direction and the Y-axis direction) in a matrix. On front surfaces of the color sections 22 and the light blocking sections 23, counter electrodes (not illustrated) are provided to face the pixel electrodes 17 on the array substrate 11a. As illustrated in FIG. 4, a long-side dimension of the CF substrate 11b is smaller than a long-side dimension of the array substrate 11a. The CF substrate 11b and the array substrate 11a are attached together such that an end of the CF substrate 11b is aligned with one end of the array substrate 11a in the long-side direction. The one end of the array substrate 11a is opposite to the other end thereof to which the terminals and the panel flexible substrate 21a are arranged. An alignment film (not illustrated) is provided on the inner surface side of each of the substrates 11a and 11b to align the liquid crystal molecules included in the liquid crystal layer.

Figure 7:
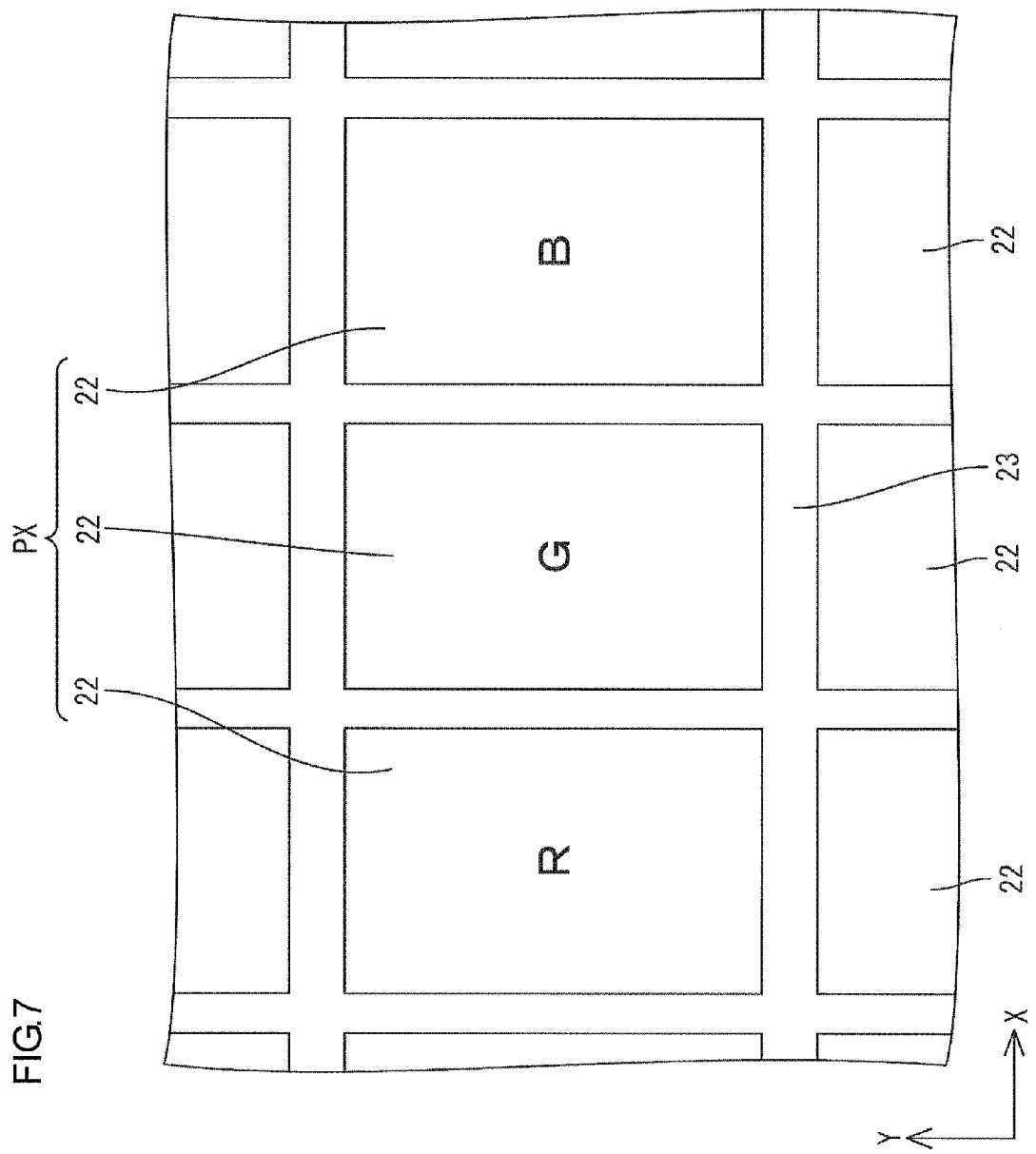
FIG. 7 is a plan view illustrating an arrangement of color sections PX on a CF substrate 11b included in the liquid crystal panel 11.

Next, the parallax barrier 12 is described. As illustrated in FIGS. 3 and 7, the parallax barrier 12 includes a pair of transparent glass substrates 12a and 12b (having light transmissivity) and a liquid crystal layer (not illustrated) provided between the substrates 12a and 12b. The liquid crystal layer includes liquid crystal molecules having optical characteristics that vary according to electric fields applied thereto. The substrates 12a and 12b are bonded together with a sealant, which is not illustrated, with keeping therebetween a space corresponding to a thickness of the liquid crystal layer. Accordingly, the liquid crystal panel is provided. The parallax barrier 12 has a size substantially same as that of the liquid crystal panel 11. The parallax barrier 12 and the liquid crystal panel 11 are arranged parallel to each other and bonded together with the adhesive layer GL. The parallax barrier 12 includes a separation area SA (the part enclosed by the chain line in FIG. 8) and a separation surrounding area SSA. The separation area SA overlaps with the display area AA of the liquid crystal panel 11. The separation area SA can separate an image displayed on the liquid crystal panel 11 by parallax. The separation surrounding area SSA has a substantially frame-like shape and is located around the separation area SA.

One of the pair of the substrates 12a and 12b arranged on the rear side (the liquid crystal panel 11 side) is a first substrate 12a and another one arranged on the front side is a second substrate 12b. The adhesive layer GL is provided on an outer surface of the first substrate 12a facing a rear side of the first substrate 12a that is a surface facing the liquid crystal panel 11. The surface of the first substrate 12a is an adhesive layer GL forming surface. The adhesive layer GL is provided over an area of the surface of the first substrate 12a having a size substantially same as a size of the separation area SA. A polarizing plate 12c is attached to an outer surface side of the second substrate 12b that is arranged on the front side. The parallax barrier 12 controls an alignment of the liquid crystal molecules and the light transmissivity depending on voltages applied to the liquid crystal layer to generate a barrier section (not illustrated). Accordingly, an image displayed on the pixels of the liquid crystal panel 11 is separated by parallax, and thus the viewer can see a stereoscopic image. In other words, the parallax barrier 12 is a switching liquid crystal panel that can switch between a flat display (the 2D image, the two-dimensional image) and a stereoscopic image (the 3D image, the three-dimensional image) by actively controlling the light transmissivity of the liquid crystal layer.

Figure 9:
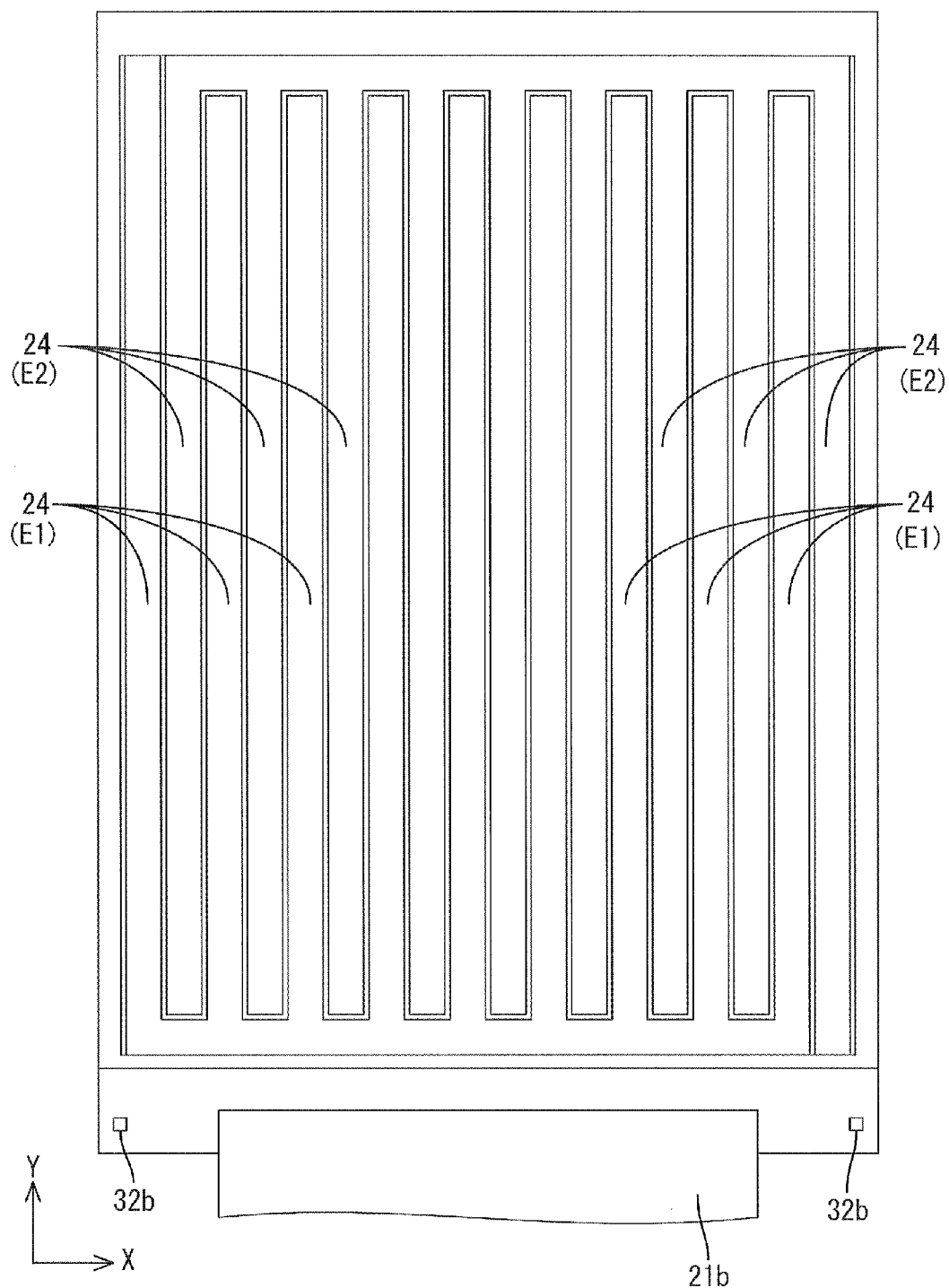
FIG. 9 is a plan view illustrating an arrangement of transparent electrodes (first electrode and second electrode) on a first substrate 12a included in the parallax barrier 12.

As illustrated in FIG. 9, transparent electrodes 24 are arranged on an inner surface side (the liquid crystal layer side, a surface facing the second substrate 12b) of the rear-side first substrate 12a that configures the parallax barrier 12. The transparent electrodes 24 are made of ITO that is a translucent material (substantially transparent metal material) having conductivity. Each transparent electrode 24 has a strip-like shape (a belt-like shape) elongated in the long-side direction (the Y-axis direction) of the first substrate 12a having a substantially constant width. The transparent electrodes 24 are arranged in the short-side direction (the X-axis direction) of the first substrate 12a at predetermined intervals. The transparent electrodes 24 are divided into two groups. The transparent electrodes 24 in one of the groups configure a first electrode E1 and the transparent electrodes 24 in the other one of the groups configure a second electrode E2. The first and second electrodes E1 and E2 are alternately arranged. Specifically, among the transparent electrodes 24 arranged in the X-axis direction, odd number transparent electrodes 24 are connected to each other at their ends and configure the first electrode E1 having a comb-like shape. Even number transparent electrodes 24 are connected to each other at their ends on the side opposite to the connected side of the odd number transparent electrodes 24 and configure the second electrode E2 having a comb-like shape fitted to the first electrode E1.

Figure 8:
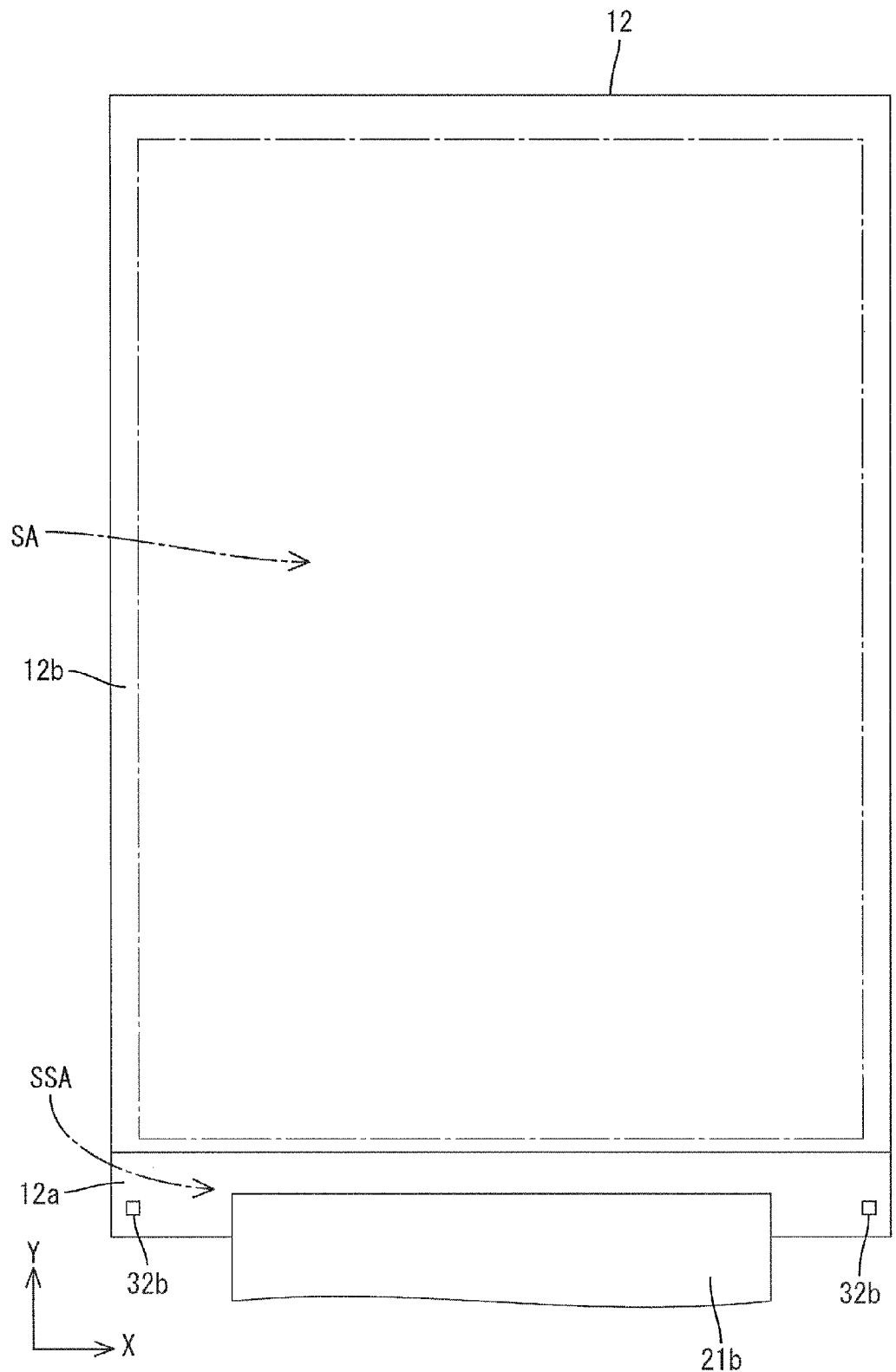
FIG. 8 is a plan view of a parallax barrier 12 to which a barrier flexible substrate 21b is connected.

On an end portion of the first substrate 12a in its long-side direction, terminals (not illustrated) extending from the first and second electrodes E1 and E2 (the transparent electrodes 24) are arranged. One end of a barrier flexible substrate 21b is connected to the terminals. The barrier flexible substrate 21b is connected to the terminals with pressure via an anisotropic conductive film, which is not illustrated. Another end of the barrier flexible substrate 21b is connected to a control board, which is not illustrated. Accordingly, a barrier signal from the control board is transferred to the first electrode E1 and the second electrode E2. As illustrated in FIG. 8, the terminals and the barrier flexible substrate 21b are arranged on the separation surrounding area SSA of the parallax barrier 12.

Figure 10:
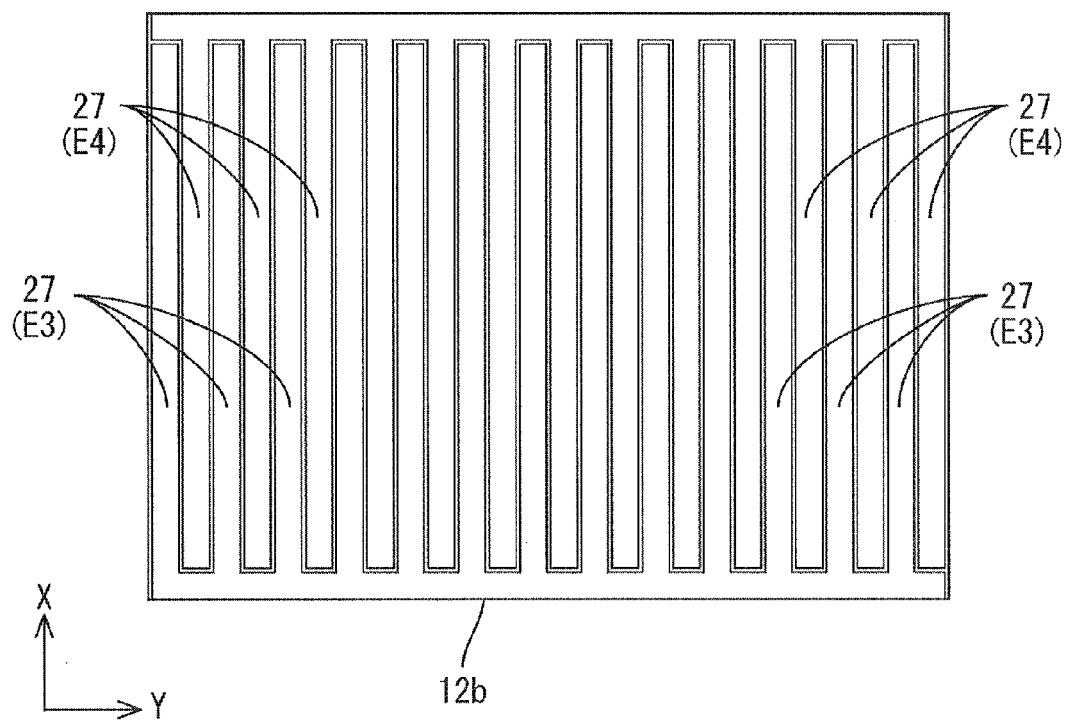
FIG. 10 is a plan view illustrating an arrangement of transparent electrodes (third electrode and fourth electrode) on a second substrate 12b included in the parallax barrier 12.

As illustrated in FIG. 10, transparent electrodes 27 are arranged on an inner surface side (the liquid crystal layer side, a surface facing the first substrate 12a) of the front-side second substrate 12b that configures the parallax barrier 12 The transparent electrodes 27 are made of ITO like the first substrate 12a. Each transparent electrode 27 has a strip-like shape (a belt-like shape) elongated in the short-side direction (the X-axis direction) of the second substrate 12b having a substantially constant width. The transparent electrodes 27 are arranged in the long-side direction (the Y-axis direction)

of the second substrate 12b at predetermined intervals. That is, the elongated direction and the arrangement direction of the transparent electrodes 27 on the second substrate 12b are perpendicular to the elongated direction and the arrangement direction of the transparent electrodes 24 on the first substrate 12a (see FIG. 9).

The transparent electrodes 27 included in the second substrate 12b are divided into two groups. The transparent electrodes 27 in one of the groups configure a third electrode E3 and the transparent electrodes 27 in the other one of the groups configure a fourth electrode E4. The third and fourth electrodes E3 and E4 are alternately arranged. Specifically, among the transparent electrodes 27 arranged in the Y-axis direction, odd number transparent electrodes 27 are connected to each other at their ends and configure the third electrode E3 having a comb-like shape. Even number transparent electrodes 27 are connected to each other at their ends on the side opposite to the connected side of the odd number transparent electrodes 27 and configure the fourth electrode E4 having a comb-like shape fitted to the third electrode E3. The third and fourth electrodes E3 and E4 (the transparent electrodes 27) are electrically connected to the terminals of the first substrate 12a via a conductive pillar (not illustrated). The conductive pillar passes through the liquid crystal layer and connects the substrates 12a and 12b, and the third and fourth electrodes E3 and E4 can receive the barrier signals therefrom. As illustrated in FIG. 8, the second substrate 12b has a long-side direction that is smaller than a long-side dimension of the first substrate 12a. The first substrate 12a and the second substrate 12b are attached together such that an end of the second substrate 12b is aligned with an end of the first substrate 12a in the long-side direction that is opposite to an end thereof to which the terminals and the barrier flexible substrate 21b are arranged.

In the attachment of the liquid crystal panel 11 and parallax barrier 12 having the above configuration using the adhesive layer GL, accurate positioning of the liquid crystal panel 11 and the parallax barrier 12 along the display surface (the X-axis and Y-axis directions) is required. If the liquid crystal panel 11 and the parallax barrier 12 are attached together without corresponding the respective X-axis directions or the respective Y-axis directions correctly, the display quality may significantly deteriorate due to the so-called crosstalk (the twin image) problem.

As illustrated in FIGS. 4, 8, and 9, first markers 32a are provided to the liquid crystal panel 11 and second markers 32b are provided to the parallax barrier 12 in the present embodiment. The first and second markers 32a and 32b are used for positioning the liquid crystal panel 11 and the parallax barrier 12 along the display surface direction. As illustrated in FIG. 4, a pair of the first markers 32a is provided in the display surrounding area ASA of the array substrate 11a of the liquid crystal panel 11. The pair of first markers 32a is arranged symmetrically in the X-axis direction with a spacer 30 therebetween. Each first marker 32a has a substantially round shape in a plan view and is made of a copper, which is a light blocking metal material having conductivity. That is, the first markers 32a are made of the same material as the gate lines 18 and the source lines 19. Accordingly, in the manufacturing procedure of the liquid crystal panel 11, the first markers 32a can be patterned at the same time of patterning the gate lines and the source lines 19 on the array substrate 11a. Consequently, the manufacturing cost can be reduced.

As illustrated in FIGS. 8 and 9, a pair of the second markers 32b is provided in the separation surrounding area SSA of the first substrate 12a of the parallax barrier 12. The pair of second markers 32b is arranged symmetrically in the X-axis direction with the connection portion of the barrier flexible substrate therebetween. Each second marker 32b has a substantially rectangular shape in a plan view. The second markers 32b can be patterned at the same time of patterning the transparent electrodes 24 in the patterning procedure of the conductive electrodes 24. Accordingly, the manufacturing cost can be reduced.

Next, the configuration of the spacer 30 arranged between the liquid crystal panel 11 and the parallax barrier 12 is described. The spacer 30 is one of main parts in the present embodiment. As illustrated in FIG. 3, a space C is provided between the liquid crystal panel 11 and the parallax barrier 12. Specifically, the space C is provided between the display surrounding area ASA of the array substrate 11a of the liquid crystal panel 11 and the separate surrounding area SSA of the first substrate 12a of the parallax barrier 12. A distance between the liquid crystal panel 11 and the parallax barrier 12 corresponding to a size of the space C is the same as the sum of thicknesses of a liquid crystal layer between the array substrate 11a and the CF substrate 11b (not illustrated), the CF substrate 11b, the polarizing plate 11d attached to the front side of the CF substrate 11b, and the adhesive layer GL.

Herein, a stress that is induced by an impact and directing toward the space C may be applied to a front side surface of the separation surrounding area SSA of the first substrate 12a of the parallax barrier 12. In such a case, if nothing is provided in the space C, a board surface of the separation surrounding area SSA of the first substrate 12a may significantly warp toward the space C side and the first substrate 12a may be damaged. Similarly, a stress that is induced by an impact and directing toward the space C side may be applied to a rear side surface of the display surrounding area ASA of the array substrate 11a of the liquid crystal panel 11. In such a case, if nothing is provided in the space C, a board surface of the separation surrounding area SSA may significantly warp toward the space C side. This may break the array substrate 11a.

In the liquid crystal display device 10 according to the present embodiment, the spacer 30 is provided in the space C. The spacer 30 is configured to define a distance between the display surrounding area ASA of the liquid crystal panel 11 and the separation surrounding area SSA of the parallax barrier 12. The spacer 30 has a substantially rectangular box shape having a uniform thickness as a whole. A front surface of the spacer 30 is parallel to the first substrate 12a of the parallax barrier 12 and in contact with an exposed surface 12a1 of the first substrate 12a that is exposed to the space C in the separation surrounding area SSA of the first substrate 12a. A rear surface of the spacer 30 is parallel to the array substrate 11a of the liquid crystal panel 11 and in contact with an exposed surface 11a1 of the array substrate 11a that is exposed to the space C in the display surrounding area ASA. Materials for the spacer 30 are unlimited. With such a spacer 30 arranged in the space C, the distance between the first substrate 12a and the array substrate 11a is defined. Therefore, if stresses directing toward the space C are applied to the substrates 12a and 11a, the significant warping of substrates 12a and 11a is hardly or less likely to occur. As a result, in the liquid crystal display device 10 in the present embodiment, the first substrate 12a (the parallax barrier 12) and the array substrate 11a (the liquid crystal panel 11) are hardly broken.

The spacer 30 is arranged so as not to overlap with the IC chip 34 in a plan view. Specifically, as illustrated in FIG. 4, the spacer 30 has a rectangular shape in a plan view extending along the short-side direction of the array substrate 11a (the X-axis direction) while staying away from a place on which the IC chip 34 is mounted.

The panel flexible substrate 21a that is connected to the one end of the array substrate 11a in a plan view is arranged so as to overlap with a part of the spacer 30. Specifically, a portion of the panel flexible substrate 21a that is connected to the array substrate 11a overlaps a part of the spacer 30. The spacer 30 is placed on the front side of the array substrate 11a. As illustrated in the cross-sectional view in FIG. 5, the part of the spacer 30 that overlaps with the panel flexible substrate 21a has a thickness smaller than the thickness of other part of the spacer 30 by a thickness of the panel flexible substrate 21a.

In the liquid crystal display device 10 in the present embodiment, a stress directing toward the space C may be applied to the display surrounding area ASA of the liquid crystal panel 11 or the separation surrounding area SSA of the parallax barrier 12. Even in such a case, the spacer 30 becomes in contact with the liquid crystal panel 11 or the parallax barrier 12, and accordingly, the further warping of the liquid crystal panel 11 or the parallax barrier 12 is less likely to occur. Therefore, the breakage of the liquid crystal panel 11 or the parallax barrier 12 is hardly or less likely to occur. In other words, in the liquid crystal display device 10 including the liquid crystal panel 11 and the parallax barrier 12 attached to each other, the breakage of the display panel 11 or the parallax barrier 12 caused by an impact-induced stresses is less likely to occur.

Herein, a configuration in which the space C between the parallax barrier 12 and the liquid crystal panel 11 is filled with a resin may be considered to prevent the breakage of the parallax barrier 12 or the liquid crystal panel 11. In such a case, complicated condition settings such as hardening conditions of the resin are required. In contrast, in the present embodiment, the spacer arranged in the space C can suppress the breakage of the parallax barrier 12 and the liquid crystal panel 11. Therefore, the above complicated condition settings are not required.

In the liquid crystal display device 10 in the present embodiment, the second substrate 12b, the first substrate 12a, the color filter substrate 11b, and the array substrate 11a are arranged in this sequence from the display surface side. The display area AA of the color filter substrate 11b and the separation area SA of the first substrate 12a are attached to each other. This achieves the liquid crystal display device 10 including the parallax barrier 12 and the liquid crystal panel 11 that are arranged in this sequence from the display surface side.

In the liquid crystal display device 10 in the present embodiment, the first markers 32a are arranged in the display surrounding area ASA of the array substrate 11a. The second markers 32b are arranged in the separation surrounding area SSA of the first substrate 12a. Then, the color filter 11b and the second substrate 12b are attached to each other such that the first markers 32a overlaps the respective second markers 32b in a plan view. Further, the spacer 30 is arranged so as not to overlap the first markers 32a and the second markers 32b in a plan view. Therefore, the spacer 30 can be arranged without covering the first and second markers 32a and 32b that are provided for positioning the display panel 11 and the parallax barrier 12. Accordingly, by the first and second markers 32a and 32b, a configuration in which the display panel 11 and the parallax barrier 12 can be attached to each other in a predetermined position is achieved.

In the liquid crystal display device 10 in the present embodiment, the panel flexible substrate 21a is connected to an outer end portion of the display surrounding area ASA of the liquid crystal panel 11, and the barrier flexible substrate 21b is connected to an outer end portion of the separation surrounding area SSA of the parallax barrier 12. The spacer 30 is arranged such that a part of the spacer 30 overlaps the panel flexible substrate 21a in a plan view. Therefore, while achieving a configuration in which the panel flexible substrate 21a is connected to the liquid crystal panel 11 and the barrier flexible substrate 21b is connected to the parallax barrier 12, the spacer 30 can be arranged in the space without being obstructed by the panel flexible substrate 21a.

In the liquid crystal display device 10 in the present embodiment, the part of the spacer 30 that overlaps with the panel flexible substrate 21a in a plan view has the thickness smaller than of the thickness of the other part of the spacer 30 that does not overlap with the panel flexible substrate 21a. Therefore, the thickness of the part of the spacer 30 that overlaps with the panel flexible substrate 21a is less likely to become too large relative to the thickness of the other part of the spacer 30. Accordingly, a stress is hardly or less likely to be applied to the array substrate 11a and the first substrate 12a toward the opposite sides from the space C side (the outer side) due to the increased thickness of the above part of the spacer 30.

In the liquid crystal display device 10 in the present embodiment, the IC chip 34 is arranged on the exposed surface 11a1 of the array substrate 11a that is exposed to the space C. The spacer 30 is arranged so as not to overlap the IC chip 34 in a plan view. Therefore, while achieving a configuration in which the IC chip 34 is arranged on the liquid crystal panel 11, the spacer 30 can be arranged in the space C without being obstructed by the IC chip 34.

<Second Embodiment>

Figure 11:
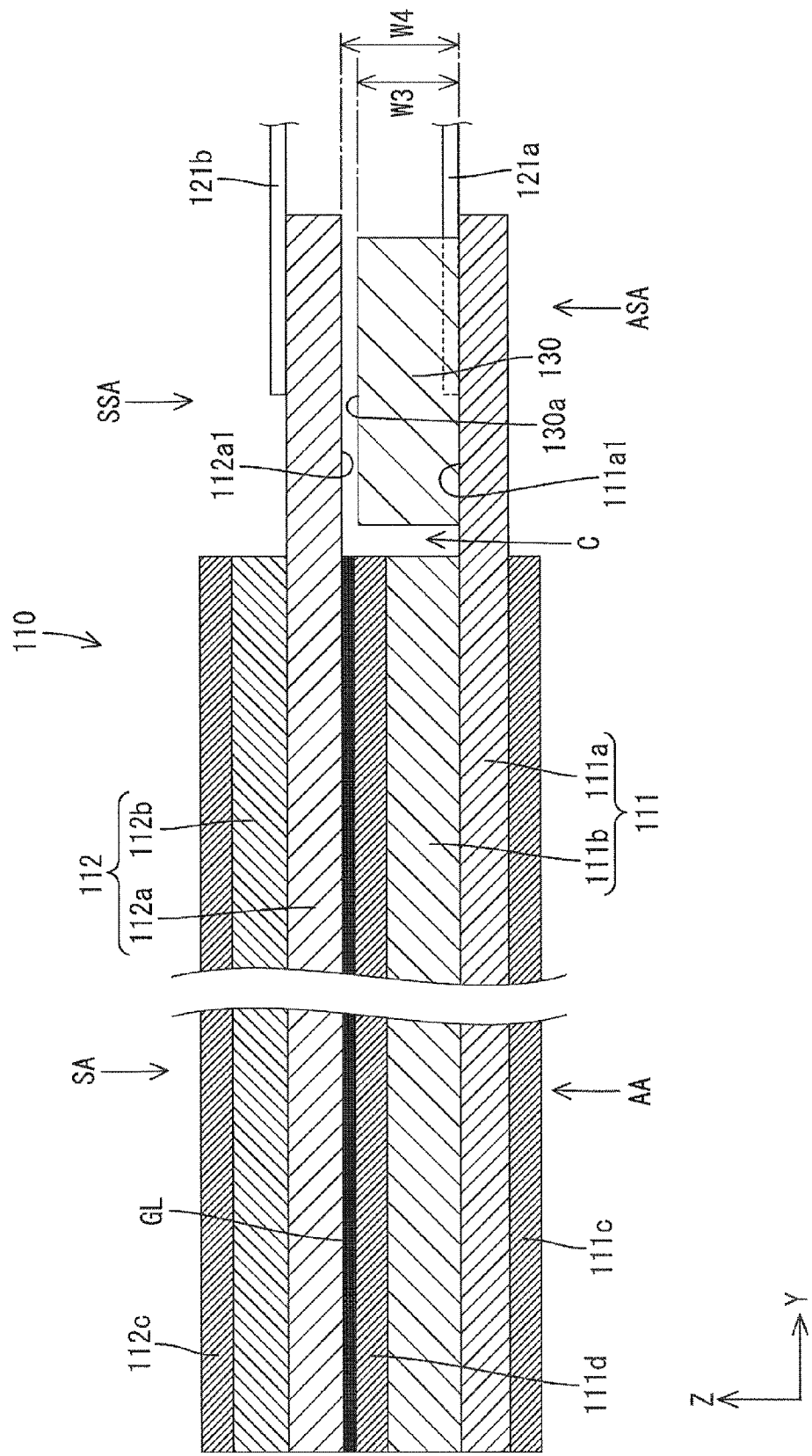
FIG. 11 is a cross-sectional view of a liquid crystal panel 110 taken along a long-side direction thereof according to a second embodiment.

A second embodiment of the present invention will be described with reference to the drawings. In the second embodiment, a thickness of a spacer 130 is different from that of the spacer in the first embodiment. Configurations, functions, and effects similar to those of the first embodiment will not be explained. In FIG. 11, members and parts indicated by the number obtained by adding 100 to the reference numerals in FIG. 3 are the same as the members and the parts explained in the first embodiment.

As illustrated in FIG. 11, in a liquid crystal display device 110 according to the second embodiment, a thickness W3 of the spacer 130 is equal to or smaller than a distance W4 between the display area AA of an array substrate 111a and the separation area SA of a first substrate 112a. That is, a front-side surface 130a of the spacer 130 is apart from an exposed surface 112a1 of the separation surrounding area SSA of the first substrate 112a that is exposed to the space C. If the thickness W3 of the spacer 130 is larger than the distance W4 between the display area AA of the array substrate 111a and the separation area SA of the first substrate 112a, the spacer 130 is in contact with and outwardly presses the display surrounding area ASA of the array substrate 111a and the separation surrounding area SSA of the first substrate 112a (the front side in the first substrate 112a, the rear side in the array substrate 111a), respectively. As a result, stresses directing sides opposite to the space C side (outside) are applied to the both substrates. In such a case, each of the display surrounding area ASA of the array substrate 111a and the separation surrounding area SSA of the first substrate 112a warps toward the outside and both or one of the substrates may be broken by an impact. According to the configuration of the second embodiment, the stresses directing toward outside are not generated and applied to the display surrounding area ASA of the array substrate 111a and the separation surrounding area SSA of the first substrate 112a. Thus, the breakage of the array substrate 111a and the first substrate 112a is hardly or less likely to occur by the spacer 130.

<Third Embodiment>

Figure 12:
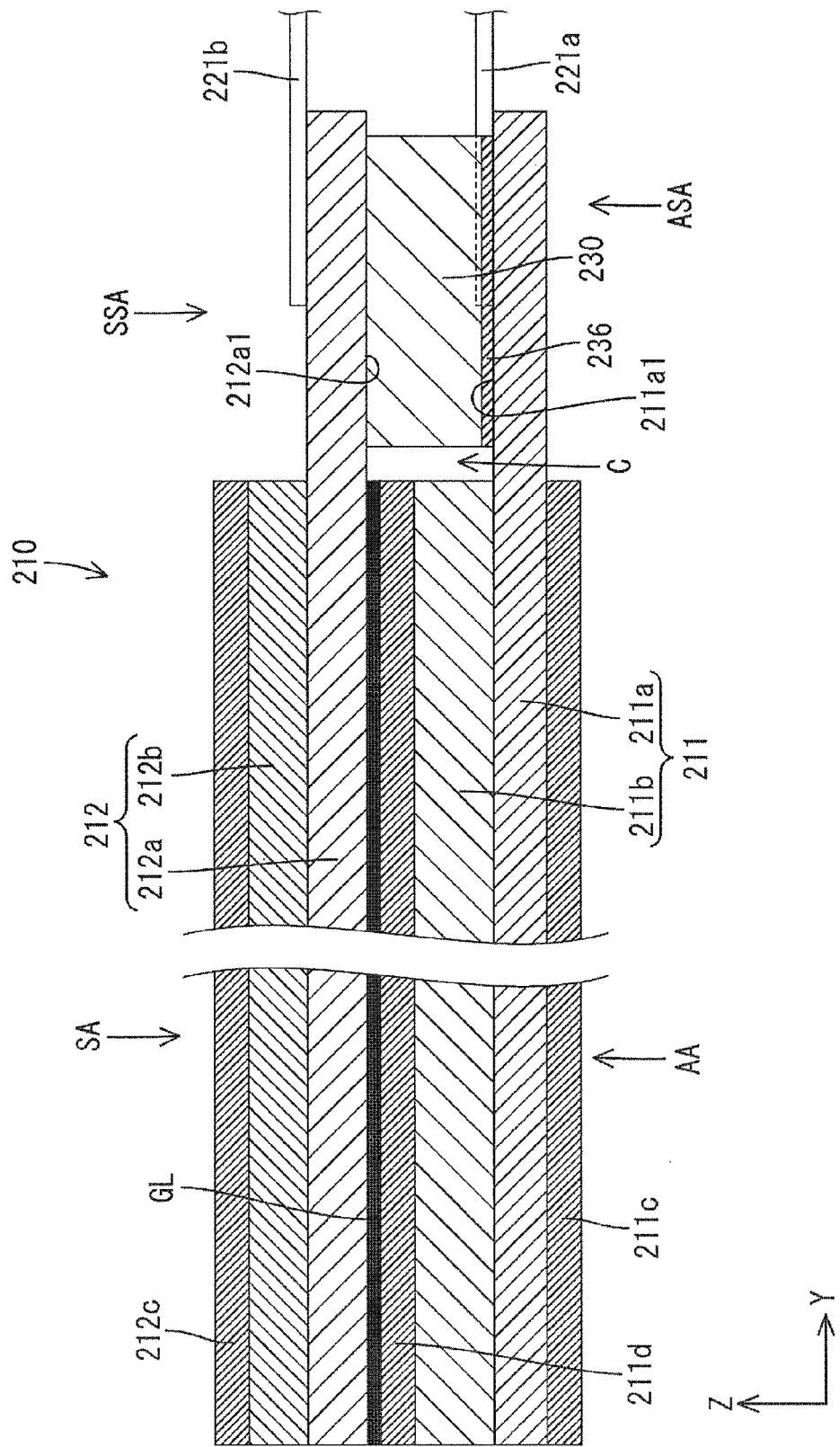
FIG. 12 is a cross-sectional view of a liquid crystal panel 210 taken along a long-side direction thereof according to a third embodiment.

A third embodiment of the present invention will be described with reference to the drawings. In the third embodiment, the arrangement condition of a spacer 230 is different from that of the spacer in the first embodiment. Configurations, functions, and effects similar to those of the first embodiment will not be explained. In FIG. 12, members and parts indicated by the number obtained by adding 200 to the reference numerals in FIG. 3 are the same as the members and the parts explained in the first embodiment.

As illustrated in FIG. 12, in a liquid crystal display device 210 according to the third embodiment, a spacer 230 is attached by a double-sided tape 236 to a surface of the display surrounding area ASA of an array substrate 211a that is exposed to the space C. Therefore, the spacer 230 is hardly or less likely to be displaced against the array substrate 211a and a first substrate 212a. Further, a thickness of the double-sided tape 236 can be easily adjusted by changing the number of turns of the double-sided tape 236 in the attachment. Therefore, the double-sided tape 236 can effectively define a distance between the display surrounding area ASA of a liquid crystal panel 211 and the separation surrounding area SSA of a parallax barrier 212.

<Fourth Embodiment>

Figure 13:
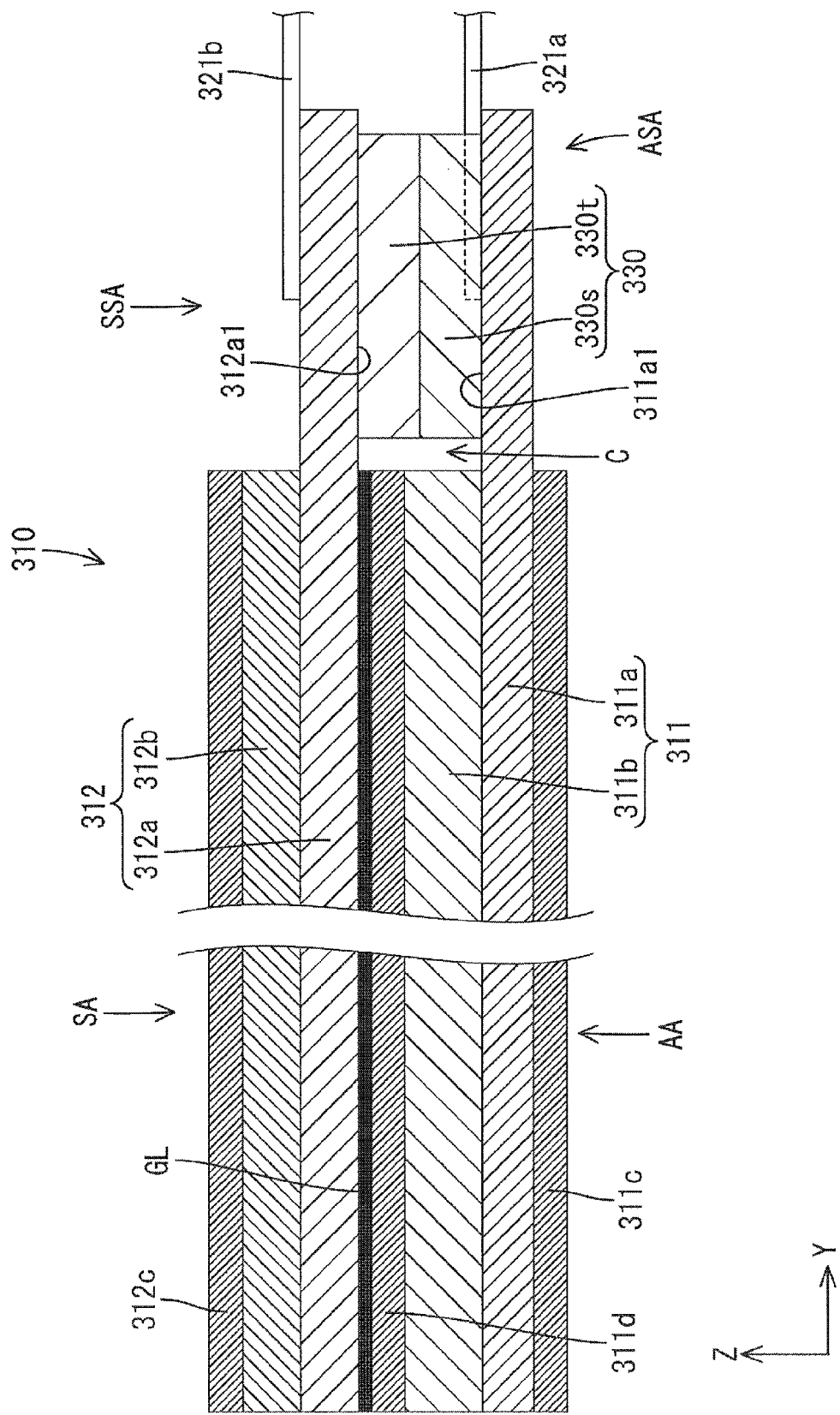
FIG. 13 is a cross-sectional view of a liquid crystal panel 310 taken along a long-side direction thereof according to a fourth embodiment.

A fourth embodiment of the present invention will be described with reference to the drawings. In the fourth embodiment, components included in a spacer 330 are different from that of the spacer in the first embodiment. Configurations, functions, and effects similar to those of the first embodiment will not be explained. In FIG. 13, members and parts indicated by the number obtained by adding 300 to the reference numerals in FIG. 3 are the same as the members and the parts explained in the first embodiment.

As illustrate in FIG. 13, in a liquid crystal display device 310 according to the fourth embodiment, the spacer 330 includes two kinds of materials 330s and 330t. The two kinds of materials 330s and 330t are used for a front side portion and a rear side portion of the spacer 330, respectively. The material 330s on the front side (a first substrate 312a side) is a rubber-like material. The material 330t on the rear side (an array substrate 311 side) is a plastic-like material. The material 330s on the front side is softer than the material 330t on the rear side. Since the spacer 330 is made of such two materials 330s and 330t in the fourth embodiment, even if a stress directing toward the inside (the space C side) is applied to the first substrate 312a, the rubber-like material 330t absorbs the stress. Thus, an excessive load is hardly or less likely to be applied to the first substrate 312a and the array substrate 311a.

<Fifth Embodiment>

Figure 14:
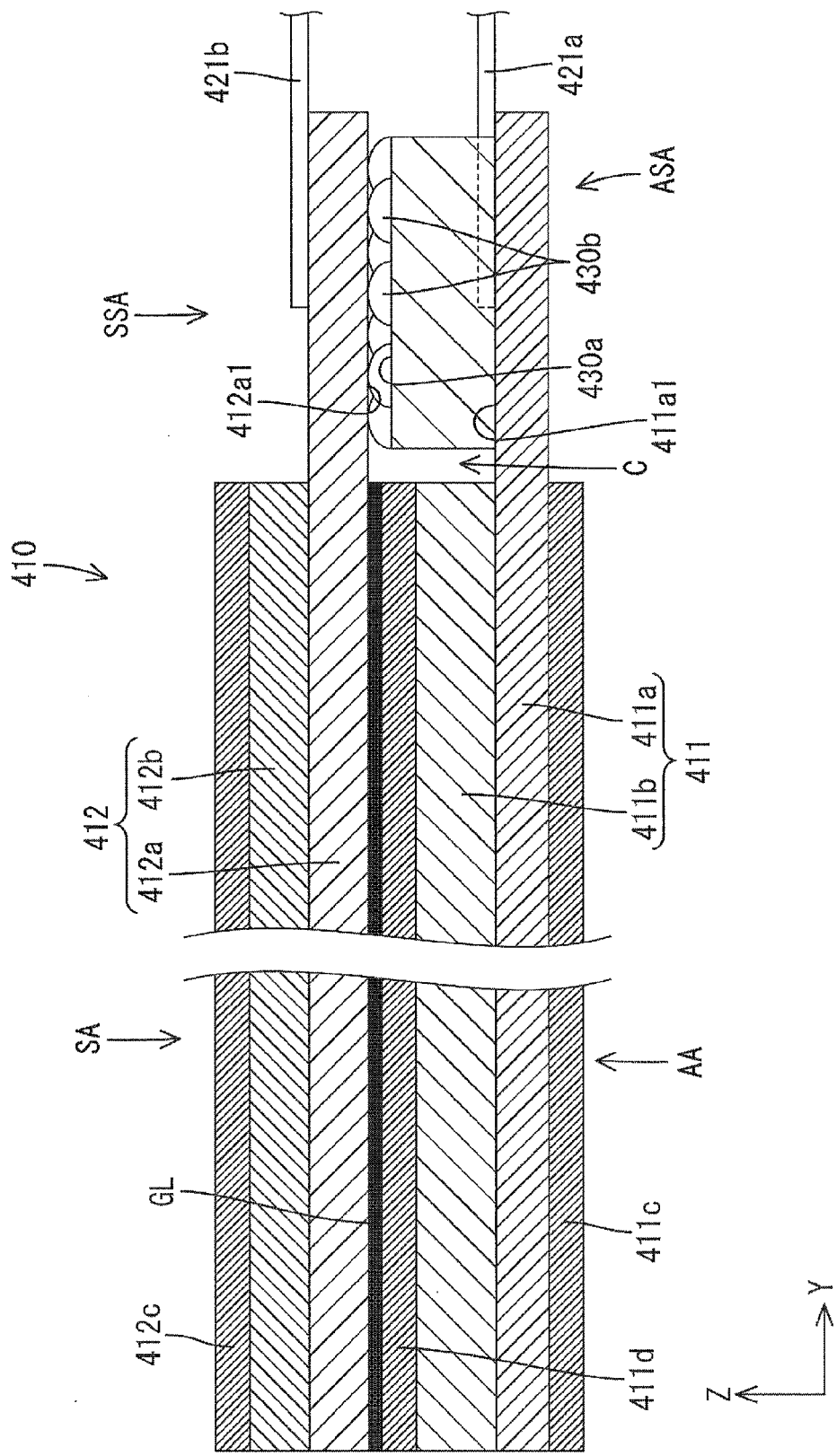
FIG. 14 is a cross-sectional view of a liquid crystal panel 410 taken along a long-side direction thereof according to a fifth embodiment.

A fifth embodiment of the present invention will be described with reference to the drawings. In the fifth embodiment, the surface configuration of a spacer 430 is different from that of the spacer in the first embodiment. Configurations, functions, and effects similar to those of the first embodiment will not be explained. In FIG. 14, members and parts indicated by the number obtained by adding 400 to the reference numerals in FIG. 3 are the same as the members and the parts explained in the first embodiment.

As illustrated in FIG. 14, in a liquid crystal display device 410 according to the fifth embodiment, a front-side surface 430a of the spacer 430 is apart from a surface 412a1 of a first substrate 412a that is exposed to the space C. Further, a plurality of spherical projections 430b are provided on the front-side surface 430a of the spacer 430. End portions of the spherical projections 430b are in contact with the surface 412a1 exposed to the space C. With such a configuration, the spacer 430 and the surface 412a1 of the first substrate 412a that is exposed to the space C are in contact with each other with a smaller contact area compared to a case in which the front-side surface 430a of the spacer 430 and the surface 412a1 of the first substrate 412a that is exposed to the space C are in contact with each other. Therefore, if a stress directing toward the inside (the space C side) is applied to the first substrate 412a, the projections 430b can disperse the stress. Thus, excessive loads are hardly or less likely to be applied to the first substrate 412a and an array substrate 411a and accordingly, the breakage of the substrates 412a and 411a is less likely to occur.

<Sixth Embodiment>

A sixth embodiment of the present invention will be described with reference to the drawings. In the sixth embodiment, the arrangement condition and the surface configuration of a spacer 530 is different from that of the spacer in the first embodiment. Configurations, functions, and effects similar to those of the first embodiment will not be explained. In FIG. 15, members and parts indicated by the number obtained by adding 500 to the reference numerals in FIG. 3 are the same as the members and the parts explained in the first embodiment.

In a liquid crystal display device 510 in the sixth embodiment, the spacer 530 is attached by a double-sided tape 536 to a surface 512a1 of a first substrate 512a that is exposed to the space C in the separation surrounding area SSA. A rear-side surface 530C of the spacer 530 is apart from a surface 511a1 of an array substrate 511a that is exposed to the space C. An IC chip 534 is arranged on the array substrate 511a. The spacer 530 has a recess 530d at a position that overlaps with the IC chip 534 in a plan view. The recess 530d is open to the array substrate 511a and houses the IC chip 534 therein. Accordingly, in the liquid crystal display device 510 in the sixth embodiment, the displacement of the spacer 530 against the array substrate 511a and the first substrate 512a is hardly or less likely to occur. Further, since the IC chip 534 is to be housed inside the recess 530d, the spacer can be arranged in the space C without being obstructed by the IC chip 534.

The above embodiments may include the following modifications.

(1) In the above embodiments, the parallax barrier is arranged on the front side of the liquid crystal panel. However, the liquid crystal panel may be arranged on the front side of the parallax barrier. In such a case, the spacer may be arranged on the front side of the parallax barrier.

(2) In the above embodiments, a single spacer is arranged in the space C between the array substrate and the first substrate. However, a plurality of the spacers may be arranged in the space C.

(3) The shape and configurations of the spacer are not limited to the above embodiments, and may be suitably changed.

The embodiments of the present invention are explained in detail above for illustrative propose only, and it is to be understood that the claims are not limited by the forgoing description. The technology described in the claims includes the various modifications of the embodiments described above.

The technology components described in the description and the drawings are not required to be used in the combination described in the claims as originally filed. The technology components can show its technical utility when used either alone or in combination. In addition, the technology described in the above description and the drawings can achieve more than one object at the same time, and the technical utility of the technology can be recognized when the technology achieves one of the objects.

EXPLANATION OF SYMBOLS 10, 110, 210, 310, 410, 510: liquid crystal display device, 11, 111, 211, 311, 411, 511: liquid crystal panel, 12, 112, 212, 312, 412, 512: parallax barrier, 13: backlight unit, 21a, 121a, 221a, 321a, 421a, 521a: panel flexible substrate, 21b, 121b, 221b, 321b, 421b, 521b: barrier flexible substrate, 30, 130, 230, 330, 430, 530: spacer, AA: display area, ASA: display surrounding area, SA: separation area, SSA: separation surrounding area.

The invention claimed is:

1. A display device, comprising:
    a display panel including a polarizing plate, a color filter substrate, a liquid crystal layer, and an array substrate, the display panel including a display area in which an image is to be displayed and a display surrounding area located around the display area;
    a parallax barrier including a first substrate and a second substrate, the parallax barrier including a separation area and a separation surrounding area that is located around the separation area, the separation area configured to separate the image displayed on the display panel by parallax,
        wherein the second substrate, the first substrate, the polarizing plate, the color filter substrate, the liquid crystal layer, and the array substrate are arranged in this order from a display surface side of the display device;
    an adhesive layer disposed between the first substrate of the parallax barrier and the polarizing plate of the display panel; and
    a spacer arranged in a space between (i) an area of the array substrate corresponding to the display surrounding area of the display panel and (ii) an area of the first substrate corresponding to the separation surrounding area of the parallax barrier,
    wherein the adhesive layer, the polarizing plate, the color filter substrate, and the liquid crystal layer are arranged between the first substrate and the array substrate, and
    wherein the spacer has a thickness smaller than a distance between the first substrate and the array substrate.

2. The display device according to claim 1, wherein the spacer is attached on a surface of the display surrounding area of the display panel that is exposed to the space.

3. The display device according to claim 1, wherein the spacer is attached on a surface of the separation surrounding area of the parallax barrier that is exposed to the space.

4. The display device according to claim 2, wherein the spacer is attached by a double-sided tape to one of the surfaces of the display panel and the surface of the parallax barrier that is exposed to the space.

5. The display device according to claim 1, wherein the spacer is formed of a plurality of materials and at least one of the plurality of materials is a material having elasticity.

6. The display device according to claim 1, wherein the spacer includes a facing surface and a plurality of projections provided on the facing surface, the facing surface facing one of the display surrounding area of the display panel and the separation surrounding area of the parallax barrier with a predetermined distance.

7. The display device according to claim 6, wherein each one of the projections has a spherical surface.

8. The display device according to claim 1, further comprising:
    a first marker provided to the area of the array substrate corresponding to the display surrounding area; and
    a second marker provided to the area of the first substrate corresponding to the separation surrounding area, wherein
    the first marker overlaps the second marker in a plan view of the display device, and
    the spacer does not overlap the first marker and the second marker in the plan view.

9. The display device according to claim 1, further comprising:
    a first flexible substrate connected to an outer end portion of the area of the display panel corresponding to the display surrounding area; and
    a second flexible substrate connected to an outer end portion of the area of the parallax barrier corresponding to the separation surrounding area, wherein
    the spacer has a part that overlaps the first flexible substrate in a plan view of the display device.

10. The display device according to claim 9, wherein
    the spacer has a further part that does not overlap the first flexible substrate in the plan view, and
    the part of the spacer that overlaps the first flexible substrate in the plan view has a thickness smaller than a thickness of the further part of the spacer.

11. The display device according to claim 1, further comprising an IC chip arranged on a surface of the array substrate that is exposed to the space, wherein the spacer does not overlap the IC chip in a plan view of the display device.

12. The display device according to claim 1, wherein
    the area of the first substrate corresponding to the separation surrounding area is larger than an area of the second substrate corresponding to the separation surrounding area, and
    the area of the array substrate corresponding to the display surrounding area is larger than an area of the color filter substrate corresponding to the display surrounding area.

13. The display device according to claim 1, wherein the space has a width equal to a sum of a thickness of the adhesive layer, a thickness of the polarizing plate, a thickness of the color filter substrate, and a thickness of the liquid crystal layer.

14. The display device according to claim 1, further comprising a lighting device facing the display panel.

* * * * *